(12) United States Patent
Ikeda et al.

(10) Patent No.: US 8,403,405 B2
(45) Date of Patent: Mar. 26, 2013

(54) VEHICULAR HOOD STRUCTURE

(75) Inventors: Koki Ikeda, Toyota (JP); Yasuhiko Katsumata, Toyota (JP); Koshi Okada, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 90 days.

(21) Appl. No.: 13/063,698

(22) PCT Filed: Apr. 21, 2009

(86) PCT No.: PCT/JP2009/057892
§ 371 (c)(1),
(2), (4) Date: Mar. 11, 2011

(87) PCT Pub. No.: WO2010/038504
PCT Pub. Date: Apr. 8, 2010

(65) Prior Publication Data
US 2011/0169303 A1    Jul. 14, 2011

(30) Foreign Application Priority Data

Sep. 30, 2008  (JP) .................................. 2008-254079

(51) Int. Cl.
*B62D 25/10* (2006.01)
(52) U.S. Cl. .......... 296/193.11; 296/187.04; 296/187.09
(58) Field of Classification Search ............ 296/187.03, 296/187.04, 187.09, 193.11
See application file for complete search history.

(56) References Cited

U.S. PATENT DOCUMENTS

| | | | |
|---|---|---|---|
| 7,631,928 B2 * | 12/2009 | Ackland et al. | 296/193.11 |
| 2005/0082874 A1 * | 4/2005 | Ikeda et al. | 296/193.11 |

FOREIGN PATENT DOCUMENTS

| | | |
|---|---|---|
| JP | 2004 148886 | 5/2004 |
| JP | 2005 75176 | 3/2005 |
| JP | 2005-343279 | 12/2005 |
| JP | 2006-8048 | 1/2006 |
| JP | 2007 98963 | 4/2007 |
| JP | 2007-290623 | 11/2007 |
| JP | 2008 68795 | 3/2008 |
| JP | 2008-132900 | 6/2008 |
| JP | 2008 143417 | 6/2008 |

OTHER PUBLICATIONS

International Search Report Issued Jul. 14, 2009 in PCT/JP09/057892 filed Apr. 21, 2009.
English traslation of the Office Action Issed Jul. 7, 2009 in Japanese Patent Application No. 2008-254079 filed Sep. 30, 2008.
Extended European Search Report issued Feb. 10, 2012, in European Patent Application No. 09817543.3.

* cited by examiner

*Primary Examiner* — Glenn Dayoan
*Assistant Examiner* — Jason S Daniels
(74) *Attorney, Agent, or Firm* — Oblon, Spivak, McClelland, Maier & Neustadt, L.L.P.

(57) ABSTRACT

A hood lock reinforcement is configured as a result of a thick sheet and a thin sheet whose sheet thicknesses are mutually different being joined, and in this hood lock reinforcement, a bottom portion including a site to which a striker is fixed is configured by the thick sheet and is disposed on a bottom wall portion of a hood inner panel. Further, an extension portion disposed extending from a hood front-rear direction rear end of the bottom portion of the hood lock reinforcement toward a hood outer panel side has a site on the hood outer panel side whose sheet thickness is set thin as compared to the sheet thickness of the bottom portion of the hood lock reinforcement as a result of that site being configured by the thin sheet.

9 Claims, 6 Drawing Sheets

VEHICULAR HOOD STRUCTURE

TECHNICAL FIELD

The present invention relates to a vehicular hood structure where a hood lock reinforcement is placed between a hood outer panel and a hood inner panel.

BACKGROUND ART

In vehicular hoods, sometimes a reinforcement for support and reinforcement is disposed between a hood outer panel and a hood inner panel (e.g., see Japanese Patent Application Laid-open No. 2004-14886 (pp. 1-2, FIG. 5)). In such vehicular hoods, the sheet thickness of the reinforcement is set thick from the standpoint of ensuring the durability of a site to which a striker for locking is fixed, that is, a site near the striker for locking.

DISCLOSURE OF THE INVENTION

Subject that the Invention is to Address

However, when the sheet thickness of the reinforcement is set thick, the deformation stroke (deformable stroke) when an impactor contacts the hood becomes smaller, and in this respect there is room for improvement.

In view of these circumstances, it is a subject of the present invention to obtain a vehicular hood structure that can increase the deformation stroke when an impactor contacts the hood while ensuring the durability of the site of the hood near the striker for locking.

Means for Addressing the Subject

A vehicular hood structure pertaining to a first aspect of the present invention comprises: a hood outer panel of a hood that covers an engine room such that it can be opened and closed; a hood inner panel of the hood that is placed on a lower side of the hood outer panel; a striker that is disposed on the hood inner panel side, that projects toward the hood lower side, and to which a lock mechanism portion on a vehicle body frame member lock; and a hood lock reinforcement that is placed between the hood outer panel and the hood inner panel to reinforce a hood front end portion, and that is equipped with a bottom portion and an extension portion. The bottom portion is disposed on the hood inner panel while including a site to which the striker is fixed and the extension portion is extending from a hood front-rear direction rear end of the bottom portion toward the hood outer panel side, and in the extension portion, the rigidity of a site at least on the hood outer panel side is set low as compared to the rigidity of the bottom portion.

According to the vehicular hood structure pertaining to the first aspect of the present invention, the bottom portion of the hood lock reinforcement is disposed on the hood inner panel, and the striker is fixed to this bottom portion, so the rigidity of the site of the hood near the striker is raised. Further, the extension portion disposed extending from the hood front-rear direction rear end of the bottom portion in the hood lock reinforcement toward the hood outer panel side is configured such that the rigidity of the site at least on the hood outer panel side is set low as compared to the rigidity of the bottom portion of the hood lock reinforcement. For this reason, when an impactor contacts the hood and a load equal to or greater than a predetermined value is input, the extension portion of the hood lock reinforcement deforms toward the hood lower side by a low load. Thus, the deformation stroke of the hood can be increased.

A second aspect of the present invention is the vehicular hood structure pertaining to the first aspect, wherein the hood lock reinforcement is formed by joining plural sheets whose sheet thicknesses are mutually different, and the sheet thickness of the site at least on the hood outer panel side of the extension portion is set thin as compared to the sheet thickness of the bottom portion.

According to the vehicular hood structure pertaining to the second aspect of the present invention, the hood lock reinforcement is formed by joining plural sheets whose sheet thicknesses are mutually different, and the sheet thickness of the site at least on the hood outer panel side of the extension portion is set thin as compared to the sheet thickness of the bottom portion, so the rigidity of the site at least on the hood outer panel side of the extension portion can be lowered with a simple configuration. Thus, when an impactor contacts the hood and a load equal to or greater than a predetermined value is input, the site in which the sheet thickness of the extension portion of the hood lock reinforcement is set thin deforms toward the hood lower side by a low load. For this reason, the deformation stroke of the hood is ensured with a simple configuration.

A third aspect of the present invention is the vehicular hood structure pertaining to the first aspect or the second aspect, wherein the hood lock reinforcement is configured such that a hood vertical direction lower end of the site in which the rigidity of the extension portion is set low as compared to the rigidity of the bottom portion is disposed along a hood width direction.

According to the vehicular hood structure pertaining to the third aspect of the present invention, the hood lock reinforcement is configured such that the hood vertical direction lower end of the site in which the rigidity of the extension portion is set low as compared to the rigidity of the bottom portion is disposed along the hood width direction, so when an impactor contacts the hood and a load equal to or greater than a predetermined value is input, the extension portion bends and deforms toward the hood lower side by a low load using the lower end as a bend line. In this manner, the hood lock reinforcement deforms in a stable deformation mode, so the deformation stroke of the hood is even more stably ensured.

Advantageous Effects of the Invention

As described above, according to the vehicular hood structure pertaining to the first aspect of the present invention, the invention has the excellent effect that it can increase the deformation stroke when an impactor contacts the hood while ensuring the durability of the site of the hood near the striker for locking.

According to the vehicular hood structure pertaining to the second aspect of the present invention, the invention has the excellent effect that it can increase the deformation stroke when an impactor contacts the hood while ensuring the durability of the site of the hood near the striker for locking.

According to the vehicular hood structure pertaining to the third aspect of the present invention, the invention has the excellent effect that it can allow the hood lock reinforcement to deform in a stable deformation mode when an impactor contacts the hood and a load equal to or greater than a predetermined value is inputted, and thus the deformation stroke can be even more stably ensured.

BEST MODES FOR CARRYING OUT THE INVENTION

First Embodiment

A vehicular hood structure pertaining to a first embodiment of the present invention will be described using FIG. 1 to FIG. 4. Arrow FR appropriately shown in these drawings represents a vehicle front side and arrow UP represents a vehicle upper side. Further, in a state where a hood is closed, the up direction of the hood is the same direction as the up direction of the vehicle and the front direction of the hood is the same as the front direction of the vehicle.

Figure 1:
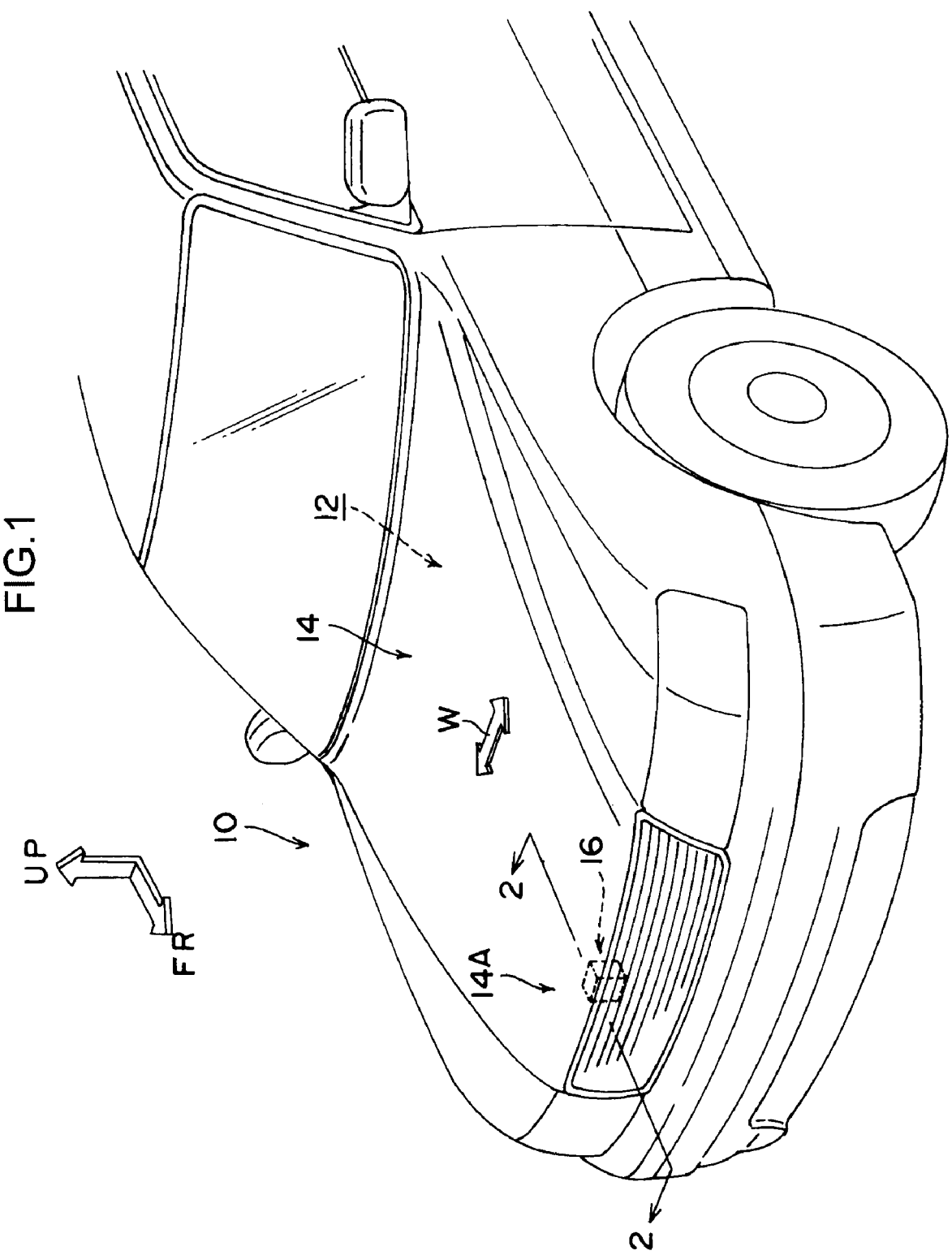
FIG. 1 is a perspective view showing a vehicle front portion to which a vehicular hood structure pertaining to a first embodiment of the present invention is applied.
Figure 2:
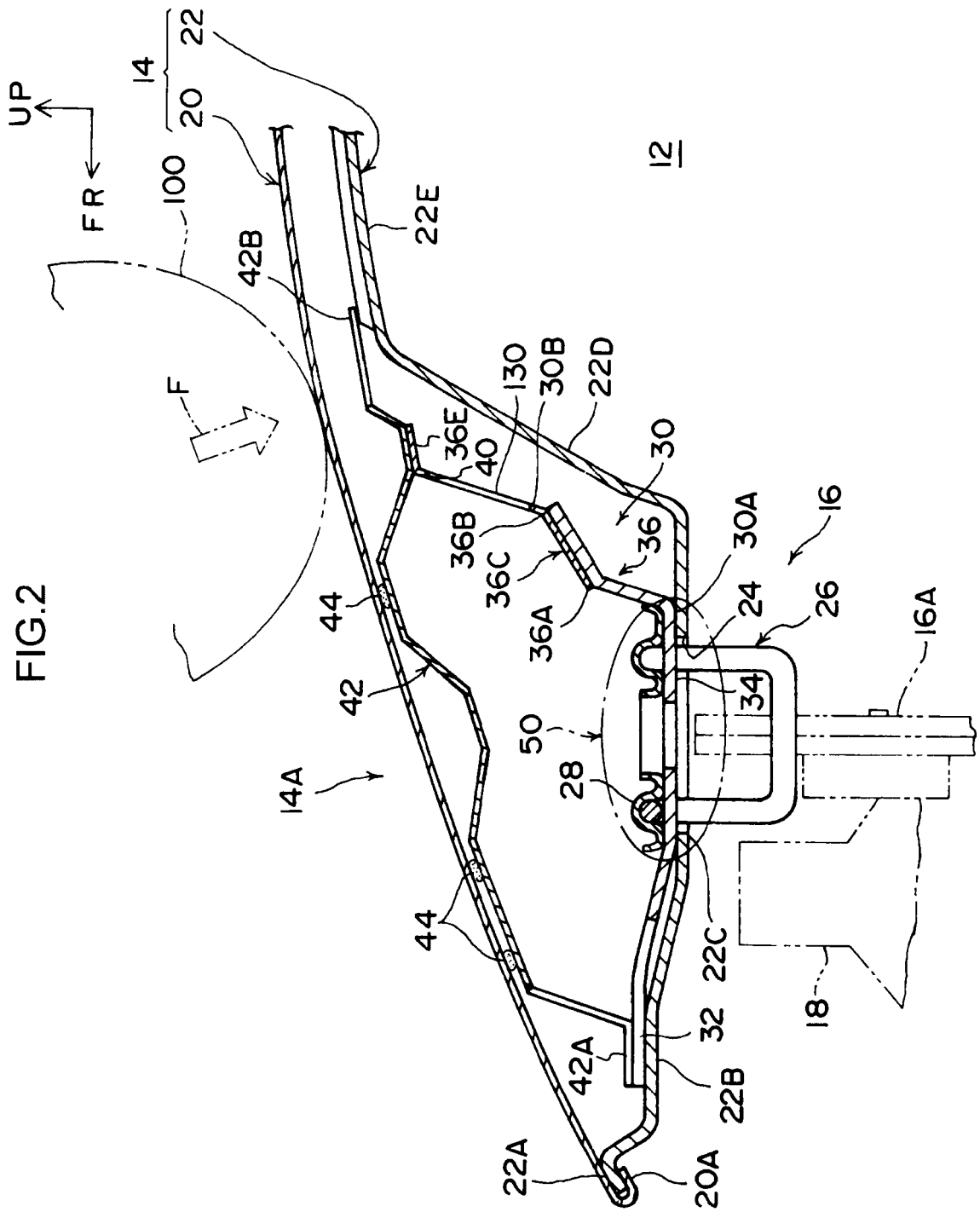
FIG. 2 is an enlarged sectional view along line 2-2 of FIG. 1.

As shown in FIG. 1, in a vehicle front portion 10, there is disposed a hood 14 that covers, such that it can open and close, an engine room 12, and a well-known hood lock mechanism 16 is disposed in correspondence to a hood width direction (the direction of arrow W, which is the same as a vehicle width direction) central portion of a front end portion 14A of the hood 14 in a closed state. As shown in FIG. 2, a lock mechanism portion 16A of the hood lock mechanism 16 is placed in a state where it is fixed to a radiator support 18 side serving as a vehicle body frame member inside the engine room 12.

An outer panel of the hood 14 is configured by a hood outer panel 20. The hood outer panel 20 extends substantially along a vehicle front-rear direction. A hood inner panel 22 is placed on a hood lower side of the hood outer panel 20. The hood inner panel 22 configures an inner panel of the hood 14. A front-end edge portion 20A of the hood outer panel 20 and a front-end edge portion 22A of the hood inner panel 22 are bonded by hemming work.

The hood outer panel 20 and the hood inner panel 22 are, in the present embodiment, both formed by press-forming an aluminium alloy sheet (an element broadly understood as a "metal sheet"; another metal sheet such as a steel sheet may also be applied in addition to an aluminium alloy sheet). In this manner, the hood 14 is made lightweight as a result of aluminium alloy sheets being applied to the hood 14.

A front-side wall portion 22B is disposed continuously with the front-end edge portion 22A on the hood inner panel 22. The front-side wall portion 22B is formed such that, overall, it slants generally toward the hood lower side while extending the hood rear. Further, a bottom wall portion 22C that extends substantially in the hood front-rear direction is disposed continuously with the hood front-rear direction rear end of the front-side wall portion 22B. Further, an upright wall portion 22D that stands up generally toward the hood rear in a direction approaching the hood outer panel 20 is disposed continuously with the hood front-rear direction rear end of the bottom wall portion 22C. Moreover, a frame portion 22E that extends generally along the hood outer panel 20 is disposed continuously with the hood front-rear direction rear end of this upright wall portion 22D.

A through hole 24 is formed through the bottom wall portion 22C of the hood inner panel 22, and a striker 26 that configures part of the hood lock mechanism 16 is inserted from a hood upper side into the through hole 24. The striker 26 is substantially U-shaped when seen in a side sectional view and is fixed to a bottom portion 34 of a hood lock reinforcement 30 via a base plate 28 that is a patch for fixing the striker, whereby the striker 26 is disposed on the bottom wall portion 22C side of the hood inner panel 22 and projects toward the hood lower side with respect to the bottom wall portion 22C. The lock mechanism portion 16A is configured such that it can lock to the striker 26.

Figure 3:
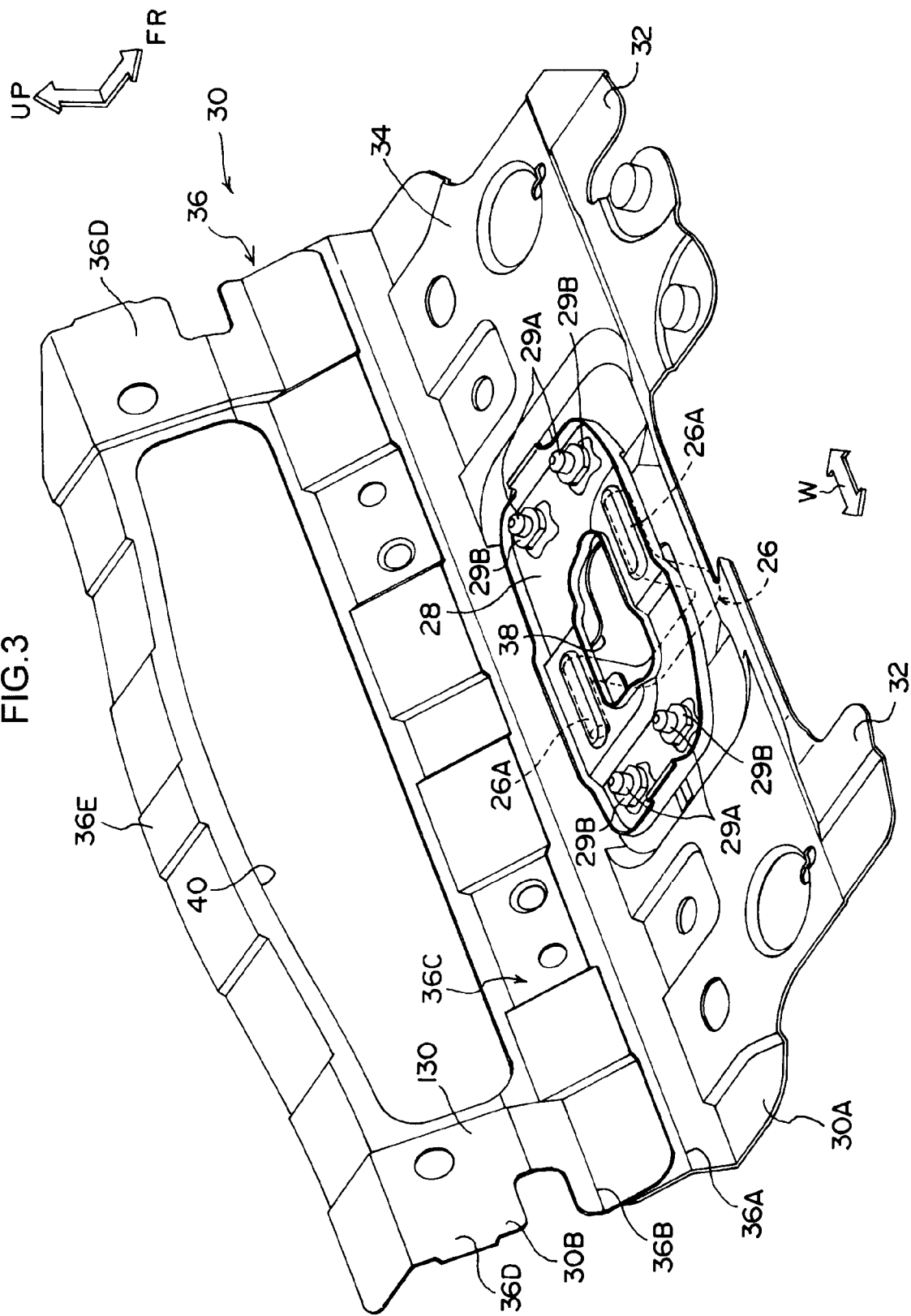
FIG. 3 is a perspective view showing relevant portions of the vehicular hood structure pertaining to the first embodiment of the present invention.

Even when the main portions of the hood 14 are configured by aluminium alloy sheets with the purpose of making the hood 14 lightweight, like in the present embodiment, it is necessary to use a high-strength ferrous metal for the striker 26 in order to ensure that the striker 26 does not bend when the hood 14 is opened and closed. For this reason, as shown in FIG. 3, the striker 26 is fixed to the hood 14 by welding base end portions 26A of the striker 26 to the base plate 28 made of a steel plate and then using fasteners (bolts 29A and nuts 29B) to fasten this base plate 28 to the bottom portion 34 (details described later) of the hood lock reinforcement 30 made of an aluminium alloy.

As shown in FIG. 2, the hood lock reinforcement 30 is placed between the hood outer panel 20 and the hood inner panel 22 for reinforcement of the hood front end portion 14A, is configured as a sheet-like body made of an aluminium alloy (generally made of metal; it may also be made of another metal such as steel in addition to being made of an aluminium alloy), and extends along the hood width direction (a direction perpendicular to the page in FIG. 2). As shown in FIG. 2 and FIG. 3, the hood lock reinforcement 30 is configured with plural (two) sheets whose sheet thicknesses are mutually different—that is, a thick sheet 30A (as one example, a sheet about 1.6 mm in thickness) serving as a sheet and a thin sheet 30B (as one example, a sheet about 0.9 mm in thickness) serving as a sheet whose sheet thickness is thinner than that of the thick sheet 30A—being joined (a hood lock reinforcement two-piece structure). The thick sheet 30A and the thin sheet 30B are formed into predetermined shapes by press forming and are thereafter joined (spot joined) by spot welding with their end portions overlapping each other, so that they configure the hood lock reinforcement 30 with the shape shown in FIG. 3.

The thick sheet 30A and the thin sheet 30B are joined by spot welding in the present embodiment, but they may also be joined by another form of joining such as, for example, FSSW, caulk bonding, and bolt fastening. Further, in the present embodiment, the thick sheet 30A and the thin sheet 30B are formed into predetermined shapes by press forming and are thereafter joined, but the thick sheet 30A and the thin sheet 30B may also be joined to form a single material and then press formed into the shape of the hood lock reinforcement 30; in the latter case, there is the advantage that the pressing step can be done once.

As shown in FIG. 2, the hood lock reinforcement 30 is equipped with the bottom portion 34 that is disposed on the bottom wall portion 22C of the hood inner panel 22, and the bottom portion 34 and the bottom wall portion 22C are joined by welding. The bottom portion 34 is configured by the thick sheet 30A; as shown in FIG. 3, a through hole 38 for allowing the striker 26 to pass therethrough is formed at the hood width direction (the direction of arrow W) central portion of the bottom portion 34, and the bottom portion 34 includes a site to which the striker 26 is fixed via the base plate 28.

That is, as shown in FIG. 2, the site of the hood 14 near the striker 26 (the range (lock portion perimeter) enclosed by the one-dot chain line in FIG. 2; hereinafter simply called "the near-striker portion 50") has a structure where the base plate 28 integrated with the striker 26 by welding is fixed to the bottom portion 34 of the hood lock reinforcement 30 and where the bottom portion 34 of the hood lock reinforcement 30 is joined to the bottom wall portion 22C of the hood inner panel 22 to thereby reinforce the bottom wall portion 22C of the hood inner panel 22 made of an aluminium alloy whose rigidity is low.

From the hood front-rear direction front end on both hood width direction sides of the bottom portion 34 of the hood lock reinforcement 30, flange portions 32 are disposed extending substantially toward the hood front side (see FIG. 3). The flange portions 32 are configured by the thick sheet 30A and are disposed on the hood upper side of the front-side wall portion 22B of the hood inner panel 22, and their distal end portions are joined by welding to the front end side of the front-side wall portion 22B.

Further, from the hood front-rear direction rear end of the bottom portion 34, an extension portion 36 is disposed extending diagonally upward toward the hood rear and toward the hood outer panel 20 side. The extension portion 36 is disposed in a position where it interconnects the hood outer panel 20 side and the hood inner panel 22 side and is configured by the thick sheet 30A and the thin sheet 30B; a first bend 36A that bends toward the hood rear side is formed in the hood vertical direction middle portion of the extension portion 36, and a second bend 36B that bends toward the hood upper side is formed on the hood outer panel 20 side from the first bend 36A. The first bend 36A and the second bend 36B are configured to serve as bending deformation origins that are disposed in order to allow the hood 14 to deform by a moderate load when an impactor 100 contacts the hood 14.

Here, the thick sheet 30A extends from the bottom portion 34 side generally upward to the second bend 36B, and the thin sheet 30B extends from the hood outer panel 20 side generally downward to the first bend 36A. That is, the portion between the first bend 36A and the second bend 36B is configured as an overlap portion 36C of the thick sheet 30A and the thin sheet 30B, and this overlap portion 36C is joined by welding. In the present embodiment, the overlap portion 36C is configured such that the thin sheet 30B is superimposed on the hood upper side of the thick sheet 30A.

Because of this configuration, the extension portion 36 is configured such that the sheet thickness of the site on the hood outer panel 20 side of the overlap portion 36C is set thin as compared to the sheet thickness of the bottom portion 34. That is, the rigidity of the site on the hood outer panel 20 side of the overlap portion 36C is set low as compared to the rigidity of the bottom portion 34. The site is defined as the low-rigidity portion 130 configured by only the thin sheet 30B toward the hood outer panel 20.

Further, the hood lock reinforcement 30 is configured such that the junction of the overlap portion 36C of the extension portion 36 is disposed along the hood width direction (parallel to the vehicle width direction) and such that the boundary between the overlap portion 36C and the low-rigidity portion 130 in the extension portion 36 extends along the hood width direction. The boundary is the site where a difference in rigidity arises. For this reason, the hood lock reinforcement 30 is configured such that the hood vertical direction lower end of the low-rigidity portion 130 in which the rigidity of the extension portion 36 is set low as compared to the rigidity of the bottom portion 34 is disposed along the hood width direction. As long as the lower end of the low-rigidity portion 130 is disposed along the hood width direction, it may be disposed continuously or may be disposed intermittently (non-continuously).

As shown in FIG. 2 and FIG. 3, a through hole 40 is formed through the extension portion 36 on the hood outer panel 20 side of the overlap portion 36C. The through hole 40 is disposed in order to control the deformation load when the impactor 100 (see FIG. 2) contacts (impacts) the hood 14, and the through hole 40 is formed in a substantially rectangular shape that is long in the hood width direction (the direction of arrow W (see FIG. 3)) in the hood width direction central portion of the thin sheet 30B.

The distal end portion on the hood outer panel 20 side of the extension portion 36 is configured as a flange portion 36E that is disposed continuously from side portions 36D which are disposed on both sides of the through hole 40 (see FIG. 3). This flange portion 36E extends in the hood width direction (the direction of arrow W (see FIG. 3)) and is joined by welding to a dent reinforcement 42 shown in FIG. 2.

The dent reinforcement 42 is placed between the hood outer panel 20 and the hood inner panel 22 in order to control deformation of the hood outer panel 20 when closing the hood 14 and is configured as a sheet-like body made of an aluminium alloy (generally made of metal; it may also be made of another metal such as steel in addition to being made of an aluminium alloy) extending in the hood width direction. The dent reinforcement 42 is joined to the hood outer panel 20 via mastic 44, and a flange portion 42A on the front end of the dent reinforcement 42 is joined by spot welding to the front end side of the flange portions 32 of the hood lock reinforcement 30 and the front-side wall portion 22B of the hood inner panel 22. Further, a flange portion 42B on the rear end of the dent reinforcement 42 is joined by welding to the frame portion 22E of the hood inner panel 22.

Further, the hood lock reinforcement 30 and the dent reinforcement 42 form a closed cross section when seen in a side sectional view and are set such that line lengths of deformation portions when the impactor 100 contacts the hood 14 become equal.

(Action and Effects)

Next, the action and effects of the above-described embodiment will be described.

In the vehicular hood structure of the present embodiment, the hood lock reinforcement 30 is configured with the thick sheet 30A and the thin sheet 30B whose sheet thicknesses are mutually different being joined. In this hood lock reinforcement 30, the bottom portion 34 including the site to which the striker 26 is fixed is configured by the thick sheet 30A and is disposed on the bottom wall portion 22C of the hood inner panel 22. For this reason, the rigidity of the near-striker portion 50 of the hood 14 is raised, and the durability of the near-striker portion 50 with respect to the load that the hood 14 receives from the striker 26 side when the hood 14 is closed also improves.

Figure 4:
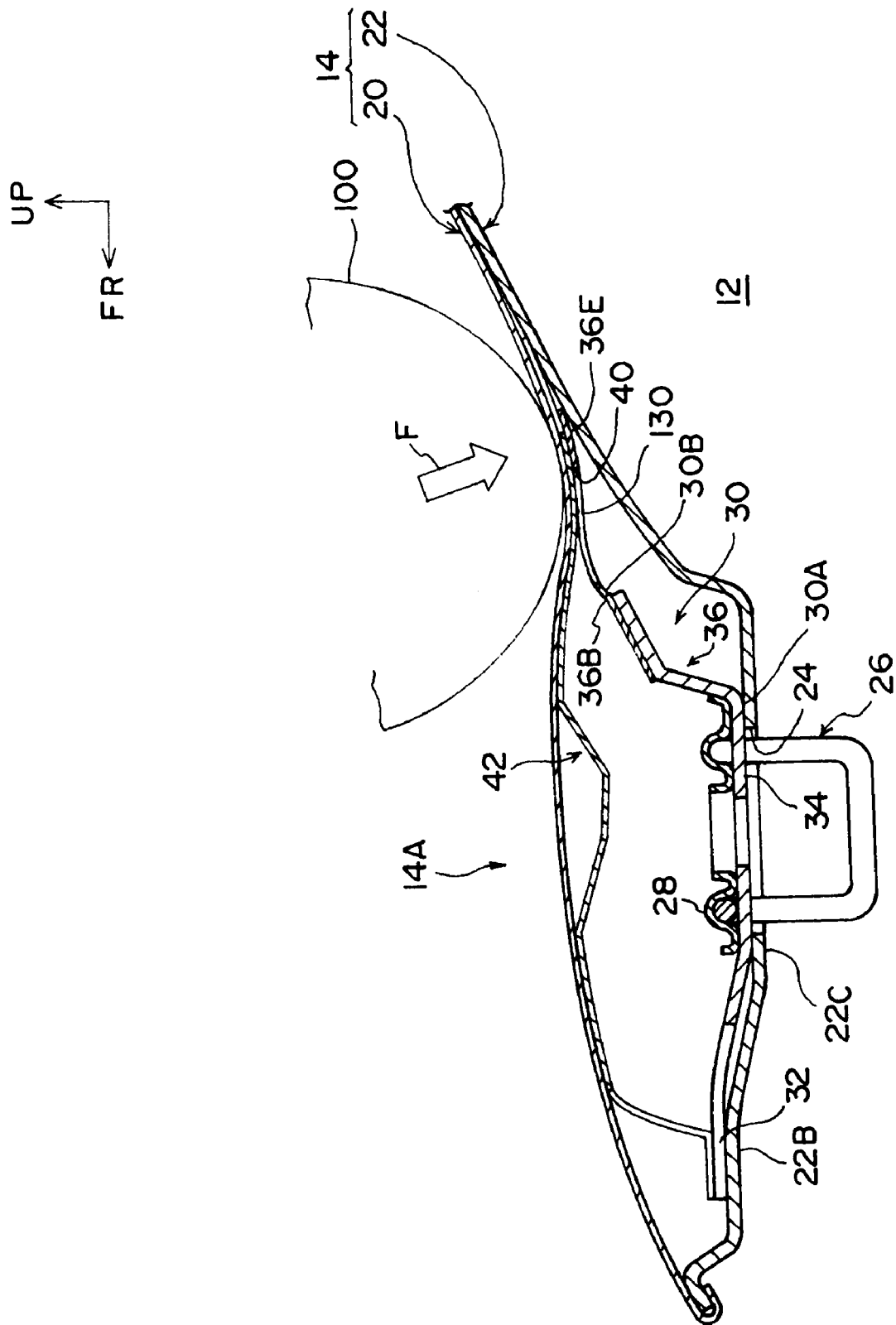
FIG. 4 is a side sectional view showing a state where an impactor contacts a hood in the vehicular hood structure pertaining to the first embodiment of the present invention.

Further, the extension portion 36 is disposed extending from the hood front-rear direction rear end of the bottom portion 34 toward the hood outer panel 20 side. The extension portion 36 has the site being configured by the thin sheet 30B on the hood outer panel 20 side whose sheet thickness is set thin as compared to the sheet thickness of the bottom portion 34. Thus, the extension portion 36 is configured such that the rigidity of the site (the low-rigidity portion 130) on the hood outer panel 20 side is set low as compared to the rigidity of the bottom portion 34 of the hood lock reinforcement 30, so when the impactor 100 contacts the hood 14 (the hood upper side of the dent reinforcement 42 or the neighborhood thereof) and a load F equal to or greater than a predetermined value is inputted, as shown in FIG. 4, the low-rigidity portion 130 of the extension portion 36 of the hood lock reinforcement 30 bends and deforms toward the hood lower side by a low load. For this reason, the deformation stroke of the hood 14 can be increased, and a good energy absorption characteristic can be obtained. This contributes to correspond to pedestrian protection.

Further, the hood lock reinforcement 30 shown in FIG. 2 is configured such that the hood vertical direction lower end of the low-rigidity portion 130 in which the rigidity of the extension portion 36 is set low as compared to the rigidity of the bottom portion 34 is disposed along the hood width direction, so when the impactor 100 contacts the hood 14 and the load F equal to or greater than the predetermined value is inputted, as shown in FIG. 4, the extension portion 36 (the low-rigidity portion 130) bends and deforms toward the hood lower side using the lower end of the low-rigidity portion 130 as a bend line. In this manner, the hood lock reinforcement 30 deforms in a stable deformation mode, so the deformation stroke of the hood 14 is even more stably ensured, and an excellent pedestrian protection characteristic can be obtained.

As described above, according to the vehicular hood structure pertaining to the present embodiment, the deformation stroke when the impactor 100 contacts the hood 14 can be increased while ensuring the durability of the near-striker portion 50 of the hood 14.

Additional effects are supplementarily described below from another standpoint by comparing the present invention to a possible structure. In order to allow the hood to deform by a moderate load at the time when an impactor contacts the hood, a structure where, for example, instead of disposing the extension portion in the hood lock reinforcement, a pair of slender leg-like flanges are made to extend from both hood front-rear direction sides of the dent reinforcement toward the hood lower side and these flanges are joined to the hood lock reinforcement is conceivable, but in this structure, in the manufacturing stage there is the potential to cause the leg-like flanges to deform before joining the flanges of the dent reinforcement and the hood lock reinforcement. That is, in the structure, the potential for the flanges to end up deforming is high as the flanges may contact another member when, for example, the dent reinforcement is put into another case from a mold or is conveyed. Handling is not easy and productivity is not good. In contrast, in the vehicular hood structure pertaining to the present embodiment, such problems can also be resolved.

Modifications of First Embodiment

In the above-described first embodiment, the extension portion 36 of the hood lock reinforcement 30 is caused to bend and deform when the impactor 100 contacts the hood 14, but the vehicular hood structure may also be configured, for example, by adjusting the strength of the junction of the thick sheet 30A and the thin sheet 30B, the junction is caused to break when the impactor 100 contacts the hood 14, so that energy is absorbed by this breaking mode.

Figure 6:
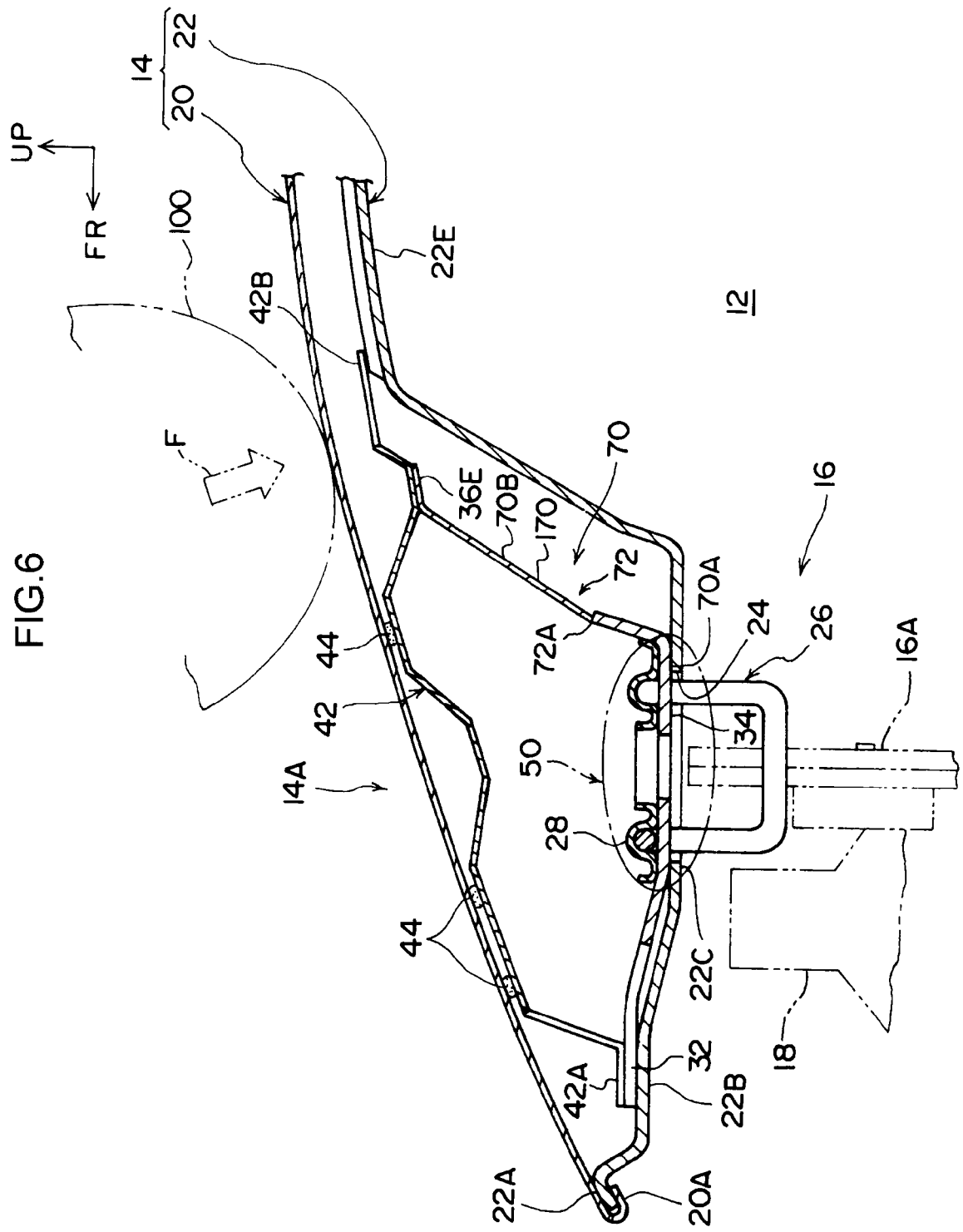
FIG. 6 is a side sectional view showing a vehicular hood structure pertaining to a third embodiment of the present invention.

Further, in the above-described first embodiment, in the hood lock reinforcement 30 shown in FIG. 2, the first bend 36A and the second bend 36B are formed in the extension portion 36, but the hood lock reinforcement may also be configured such that, for example, only a bend corresponding to the first bend 36A is formed in the extension portion. In this case, the hood lock reinforcement may be configured such that the thick sheet (30A) is extended from the bottom portion (34) side to the bend (the bend corresponding to the first bend 36A) and such that the thin sheet (30B) is extended from the hood outer panel 20 side to the bottom portion (34) side (toward the bottom portion (34)) of the bend and is bent along the bend so that the end portion of the thick sheet (30A) and the end portion of the thin sheet (30B) are overlapped and such that both are joined by spot welding or the like. In other words, the hood lock reinforcement may also be configured where, as a modification of a third embodiment (see FIG. 6) described later, an end portion on a thick sheet (a thick sheet 70A serving as a sheet) side of a thin sheet (a thin sheet 70B serving as a sheet) shown in FIG. 6 is elongated and bent, extends substantially toward the hood lower side along a rear end of the thick sheet (70A) (a site of the thick sheet (70A) configuring part of an extension portion (72)), and is caused to overlap that rear end of the thick sheet (70A), and with this overlap portion being joined by spot welding). Note that, in this modification, the thin sheet (30B) may be overlapped and joined to the hood front-rear direction front side of the thick sheet (30A) or may be overlapped and joined to the hood front-rear direction rear side of the thick sheet (30A).

Figure 5:
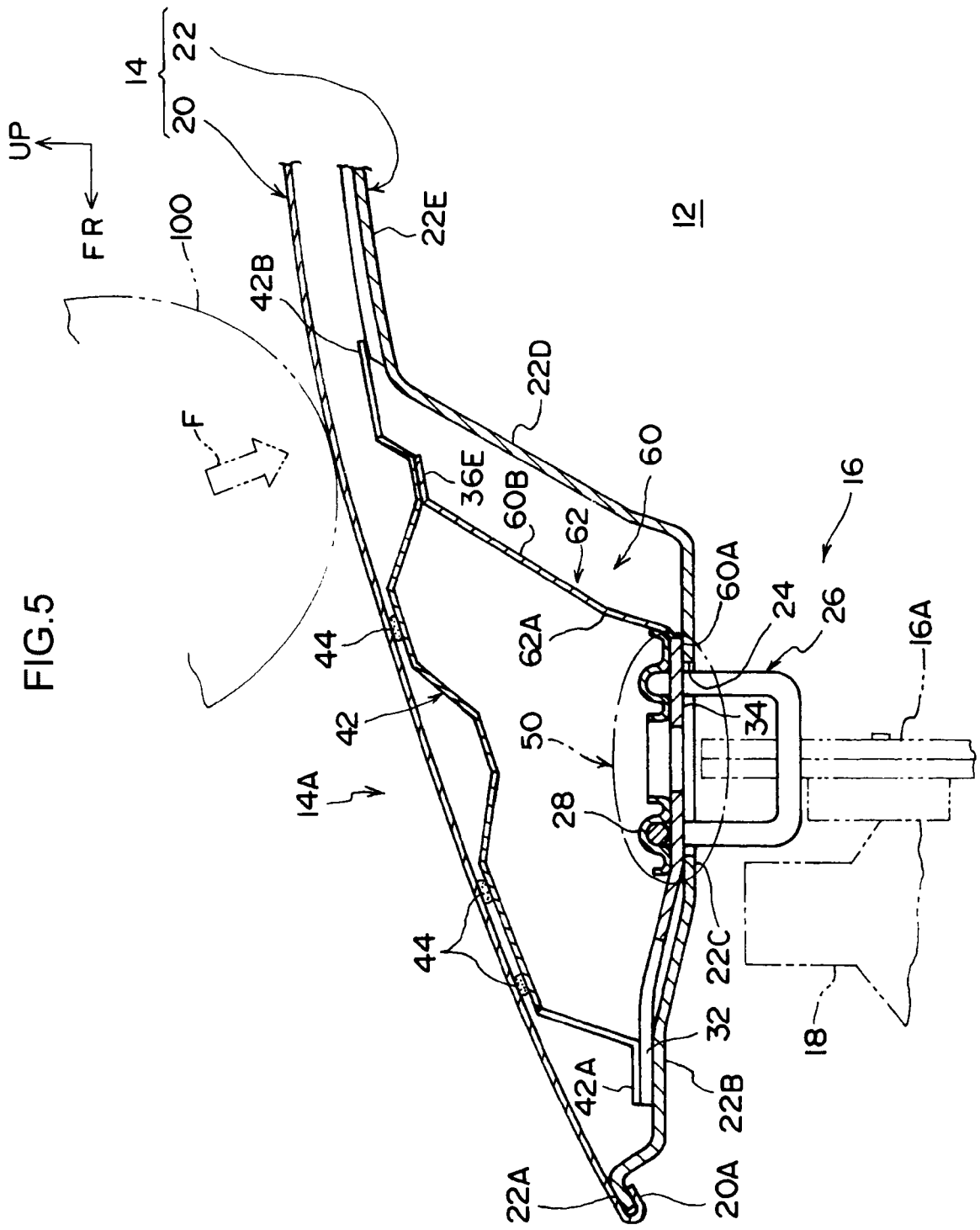
FIG. 5 is a side sectional view showing a vehicular hood structure pertaining to a second embodiment of the present invention.

Further, as another modification, the hood lock reinforcement may also be configured such that the extension portion (36) is configured by only the thin sheet (30B) and the distal end portion on the bottom portion (34) side of the thin sheet (30B) is bent and extends toward the hood front side and is overlapped and joined by spot welding or the like to the thick sheet (30A, the main configural portion of the bottom portion (34)). In other words, the hood lock reinforcement may also be configured where, as a modification of a second embodiment (see FIG. 5) described later, an end portion on a thick sheet (a thick sheet 60A serving as a sheet) side of a thin sheet (a thin sheet 60B serving as a sheet) shown in FIG. 5 is elongated and bent, extends toward the hood front side, and is overlapped the thick sheet (60A), and with this overlap portion being joined by spot welding. Note that, the thin sheet (30B) in this case may be overlapped the hood vertical direction upper side of the thick sheet (30A) or may be overlapped the hood vertical direction lower side of the thick sheet (30A). Also, the hood lock reinforcement may have a configuration where the first bend (36A) and the second bend (36B) are formed in the extension portion (36) or a configuration where only a bend corresponding to the first bend (36A) is formed in the extension portion (36).

Second Embodiment

Next, a vehicular hood structure pertaining to a second embodiment of the present invention will be described using FIG. 5. In FIG. 5, the vehicular hood structure pertaining to the second embodiment of the present invention is shown in a side sectional view (a side sectional view corresponding to FIG. 2 in the first embodiment). As shown in this drawing, the vehicular hood structure differs from the hood lock reinforcement 30 (see FIG. 2) of the first embodiment in terms of the site where the difference in rigidity is disposed in a hood lock reinforcement 60. Additionally, the hood lock reinforcement 60 is configured by a butt joint rather than a lap joint. Other configurations are substantially the same as those in the first embodiment. Thus, in regard to configural portions that are substantially the same as those in the first embodiment, identical reference signs will be given thereto and description thereof will be omitted.

As shown in FIG. 5, the hood lock reinforcement 60 is placed between the hood outer panel 20 and the hood inner panel 22 for reinforcement of the hood front end portion 14A, generally has the same shape overall as the hood lock reinforcement 30 in the first embodiment (see FIG. 2), and the manner in which it is joined to other members is also configured to be the same. Thus, in regard to configural portions that are substantially the same as those of the hood lock reinforcement 30 (see FIG. 2), identical reference signs will be given thereto and description thereof will be omitted. This hood lock reinforcement 60 is made of an aluminium alloy (generally made of metal; it may also be made of another metal such as steel in addition to being made of an aluminium alloy) and is configured as plural (two) sheets whose sheet thicknesses are mutually different are joined (line joined) by FSW (Friction Stir Welding, tailored blanks). That is, a thick sheet 60A and a thin sheet 60B whose sheet thickness is thinner than that of the thick sheet 60A are joined in a state where they butt against each other. Instead of joining by FSW, joining by laser welding may also be applied.

The hood lock reinforcement 60 is, in the present embodiment, formed into the shape shown in FIG. 5 by press forming after the thick sheet 60A and the thin sheet 60B have been butt-joined to form a single material. For this reason, there is the advantage that the pressing step only has to be performed once. The hood lock reinforcement 60 may also be configured such that the thick sheet 60A and the thin sheet 60B are formed into predetermined shapes by press forming and are thereafter joined.

As shown in FIG. 5, from the hood front-rear direction rear end of the bottom portion 34, an extension portion 62 is disposed extending diagonally upward in the hood rear direction toward the hood outer panel 20 side. This extension portion 62 is configured by the thin sheet 60B, whereby its sheet thickness is thin as compared to that of the bottom portion 34 and its rigidity is set low as compared to that of the bottom portion 34.

A bend 62A that bends the extension portion 62 toward the vehicle rear side is formed in the hood vertical direction middle portion of the extension portion 62. This bend 62A is provided to serve as a bending deformation origin in order to allow the hood 14 to deform by a moderate load when the impactor 100 contacts the hood 14.

Further, the hood lock reinforcement 60 is configured such that the junction (junction line) of the thick sheet 60A and the thin sheet 60B is disposed along the hood width direction (parallel to the vehicle width direction). In other words, the hood lock reinforcement 60 is configured such that the hood vertical direction lower end of the extension portion 62 having a lower rigidity as compared to the rigidity of the bottom portion 34 is disposed along the hood width direction (the direction perpendicular to the page in FIG. 5).

Because of this configuration also, substantially the same action and effects as those in the first embodiment can be obtained. Further, according to the present embodiment, the hood lock reinforcement 60 is configured to have a butt joint rather than a lap joint, so when the impactor 100 contacts the hood 14 and the load F equal to or greater than the predetermined value is input, it is easy for the extension portion 62 to deform because there is no overlap portion as compared to the case of a lap joint. Moreover, not only a partial site on the hood outer panel 20 side of the extension portion 62 but all sites of the extension portion 62 is set to have low rigidity as compared to the rigidity of the bottom portion 34, so it is easier for the extension portion 62 to deform at the time when the impactor 100 contacts the hood 14. Thus, in the present embodiment, the deformation stroke of the hood 14 can be more efficiently ensured at the time when the impactor 100 contacts the hood 14.

Further, as another effect, it becomes possible to make the hood lock reinforcement 60 compact as there is no lap portion of the thick sheet 60A and thin sheet 60B as compared to a hood lock reinforcement that has been lap joined. A length of a site at a hood rear side of the striker 26 can be shortened as compared to a structure where there is an overlap portion on the bottom portion 34 side, and the hood lock reinforcement 60 becomes light.

Third Embodiment

Next, a vehicular hood structure pertaining to a third embodiment of the present invention will be described using FIG. 6. In FIG. 6, the vehicular hood structure pertaining to the third embodiment is shown in a side sectional view (a side sectional view corresponding to FIG. 5 in the second embodiment). As shown in this drawing, in the vehicular hood structure pertaining to the third embodiment, the site (junction) where the difference in rigidity is disposed differs from the site (junction) where the difference in rigidity is disposed in the hood lock reinforcement 60 pertaining to the second embodiment. Other configurations are substantially the same as those in the second embodiment. Thus, in regard to configural portions that are substantially the same as those in the second embodiment, identical reference signs will be given thereto and description thereof will be omitted.

As shown in FIG. 6, the hood lock reinforcement 70 is placed between the hood outer panel 20 and the hood inner panel 22 for reinforcement of the hood front end portion 14A, generally has the same shape overall as the hood lock reinforcement 60 in the second embodiment (see FIG. 5) excluding the point described below, and the manner in which it is joined to other members is also configured to be the same. Thus, in regard to configural portions that are substantially the same as those of the hood lock reinforcement 60 (see FIG. 5), identical reference signs will be given thereto and description thereof will be omitted.

This hood lock reinforcement 70 is made of an aluminium alloy (generally made of metal; it may also be made of another metal such as steel in addition to being made of an aluminium alloy) and is configured as plural (two) sheets whose sheet thicknesses are mutually different is joined (line joined) by FSW (tailored blanks). That is, a thick sheet 70A and a thin sheet 70B whose sheet thickness is thinner than that of this thick sheet 70A are joined in a state where they butt against each other. Instead of joining by FSW, joining by laser welding may also be applied.

As shown in FIG. 6, from the hood front-rear direction rear end of the bottom portion 34, an extension portion 72 is disposed extending diagonally upward in the hood rear direction toward the hood outer panel 20. This extension portion 72 is configured by the thick sheet 70A and the thin sheet 70B, and a bend 72A that bends extension portion 72 toward the hood rear side is formed in the hood vertical direction middle portion of the extension portion 72. This bend 72A is configured to serve as a bending deformation origin that is disposed in order to allow the hood 14 to deform by a moderate load when the impactor 100 contacts the hood 14. Here, the thick sheet 70A extends from the bottom portion 34 side to the bend 72A, and the thin sheet 70B extends from the hood outer panel 20 side approximately to the bend 72A.

Because of this configuration, the extension portion 72 is configured such that the sheet thickness of the site on the hood outer panel 20 side of the bend 72A is set thin as compared to the sheet thickness of the bottom portion 34. The site is defined as a low-rigidity portion 170 configured by the thin sheet 70B toward the hood outer panel 20. And the rigidity of the low-rigidity portion 170 is set low as compared to the rigidity of the bottom portion 34.

Further, the hood lock reinforcement 70 is configured such that the junction (junction line) of the thick sheet 70A and the thin sheet 70B is subjected to bending work to coincide with the bend 72A. The bend 72A is disposed along the hood width direction. In other words, in the hood lock reinforcement 70, the hood vertical direction lower end of the low-rigidity portion 170 in which the rigidity of the extension portion 72 is set low as compared to the rigidity of the bottom portion 34 is disposed along the hood width direction.

Because of this configuration also, substantially the same action and effects as those in the second embodiment can be obtained. Further, according to the present embodiment, since the junction (junction line) between the thick sheet 70A and the thin sheet 70B of the hood lock reinforcement 70 coincides with the bend 72A, when the impactor 100 contacts the hood 14 and the load F equal to or greater than the predetermined value is input, the deformation may be started at the bend 72A. And the hood lock reinforcement 70 easily bends and deforms toward the hood lower side using the bend 72A that is the junction of the thick sheet 70A and the thin sheet 70B as the bending origin. Thus, in the present embodiment, at the time when the impactor 100 contacts the hood 14, the hood lock reinforcement 70 bends and deforms in an even more stable deformation mode.

Supplemental Description of the Embodiments

In the above-described embodiments, the hood lock reinforcements 30, 60, and 70 are configured of two sheets whose sheet thicknesses are mutually different (the thick sheets 30A, 60A, and 70A and the thin sheets 30B, 60B, and 70B) being joined, but the hood lock reinforcement may also be configured of three sheets whose sheet thicknesses are mutually different (as one example, one thick sheet and two thin sheets of the same thickness whose sheet thickness is thinner than that of this thick sheet) being joined. Another hood lock reinforcement may be employed where the sheet thickness of the site at least on the hood outer panel side of the extension portion and the sheet thickness of the flange portions disposed extending from the front end of the bottom portion substantially toward the hood front side (the flange portions corresponding to the flange portions 32 of the above-described embodiments) are set thin as compared to the sheet thickness of the bottom portion.

Further, in the above-described embodiments, the hood lock reinforcements 30, 60, and 70 are configured of two sheets whose sheet thicknesses are mutually different (the thick sheets 30A, 60A, and 70A and the thin sheets 30B, 60B, and 70B) being joined, whereby the sheet thickness of the site at least on the hood outer panel 20 side of the extension portions 36, 62, and 72 is set thin as compared to the sheet thickness of the bottom portion 34, but the hood lock reinforcement may also be configured by a single sheet with no junction and where the sheet thickness of the site at least on the hood outer panel side of the extension portion is set thin as compared to the sheet thickness of the bottom portion by cutting work or the like.

Moreover, in the above-described embodiments, the hood lock reinforcements 30, 60, and 70 are configured such that the rigidity of the site at least on the hood outer panel 20 side of the extension portions 36, 62, and 72 is set low as compared to the rigidity of the bottom portion 34 as a result of the sheet thickness of the site at least on the hood outer panel 20 side of the extension portions 36, 62, and 72 being set thin as compared to the sheet thickness of the bottom portion 34. But another hood lock reinforcement may be employed where the rigidity of the site at least on the hood outer panel side of the extension portion is set low as compared to the rigidity of the bottom portion by a configuration that plural sheets whose sheet thicknesses are the same but whose materials (rigidities) are mutually different being joined or by administering a treatment to raise the rigidity of only a particular portion of a single sheet with no junction (e.g., a heat treatment such as high-frequency quenching when the sheet comprises a steel material).

In the above-described embodiments, the hood lock reinforcements 30, 60, and 70 are configured such that the hood vertical direction lower end of the site in which the rigidity of the extension portions 36, 62 and 72 is set low as compared to the rigidity of the bottom portion 34 is disposed along the hood width direction, and this configuration is preferred from the standpoint of allowing the hood lock reinforcements 30, 60, and 70 to deform in a stable deformation mode when the impactor 100 contacts the hood 14 and the load F equal to or greater than the predetermined value is inputted. But another hood lock reinforcement may be employed where the hood vertical direction lower end of the site in which the rigidity of the extension portion is set low as compared to the rigidity of the bottom portion is not disposed along the hood width direction.

The disclosure of Japanese Patent Application No. 2008-254079 is incorporated in its entirety into the present specification by reference.

The invention claimed is:

1. A vehicular hood structure comprising:
    a hood outer panel of a hood that covers an engine room to be opened and closed;
    a hood inner panel of the hood being placed on a hood lower side of the hood outer panel;
    a hood lock reinforcement that is placed between the hood outer panel and the hood inner panel to reinforce a hood front end portion, and that is equipped with a bottom portion and an extension portion, the bottom portion disposed on the hood inner panel and the extension portion disposed extending from a hood front-rear direction rear end of the bottom portion toward the hood outer panel side, and in the extension portion, the rigidity of a site at least on the hood outer panel side being set low as compared to the rigidity of the bottom portion;
    a base plate that is disposed and overlapped only on the bottom portion of the hood lock reinforcement; and
    a striker that is fixed to the base plate, that projects toward the hood lower side through a through hole formed in the hood inner panel, and to which locking parts on a vehicle body frame member locks,
    wherein the hood lock reinforcement is formed by joining plural sheets whose sheet thicknesses are mutually different, and is configured such that a sheet thickness of the site at least on the hood outer panel side in the extension portion is set thin as compared to the sheet thickness of the bottom portion, and a vehicle width direction length in a hood vertical direction lower end of a low-rigidity portion of the extension portion is longer than a vehicle width direction length of the base plate, the rigidity in the low-rigidity portion of the extension portion being set low as compared to the rigidity of the bottom portion.

2. The vehicular hood structure according to claim 1, wherein the extension portion is equipped with an overlap portion in which a thick sheet and a thin sheet overlap each other along a hood width direction, and the low-rigidity portion is formed by the thin sheet.

3. The vehicular hood structure according to claim 2, wherein a first bend that bends in the hood outer panel direction toward the hood rear side is formed in a hood front-rear direction front end portion of the overlap portion, and the first bend is configured to serve as a bending deformation origin when an impactor contacts the hood.

4. The vehicular hood structure according to claim 3, wherein a second bend that bends more toward the hood outer panel side than the first bend is formed in a hood front-rear direction rear end portion of the overlap portion, and the second bend is configured to serve, together with the first bend, as a bending deformation origin when an impactor contacts the hood.

5. The vehicular hood structure according to claim 2, wherein the overlap portion is joined by spot welding.

6. The vehicular hood structure according to claim 2, wherein a wall between the hood front-rear direction rear end of the bottom portion of the hood lock reinforcement and the overlap portion extends toward the hood outer panel side and diagonally upward in the hood rear direction.

7. The vehicular hood structure according to claim 1, further comprising a dent reinforcement,
wherein the dent reinforcement and the hood lock reinforcement, which are placed between the hood outer panel and the hood inner panel and extend in the hood width direction, form a closed cross section when seen in a side sectional view in the hood front-rear direction, and wherein, at a junction positioned on the rear side of the hood between the dent reinforcement and the hood lock reinforcement, a clearance is disposed between the dent reinforcement and the hood outer panel.

8. The vehicular hood structure according to claim 7, wherein the dent reinforcement and the hood lock reinforcement are set such that respective lengths of deformation portions in a case in which an impactor contacts the hood become equal.

9. The vehicular hood structure according to claim 1, wherein the extension portion of the hood lock reinforcement is formed by joining plural sheets whose sheet thicknesses are mutually different such that a sheet thickness of the extension portion is varied.

* * * * *